(12) United States Patent
Chen (10) Patent No.: US 9,560,580 B2
(45) Date of Patent: Jan. 31, 2017

(54) METHOD OF MANAGING POWER OF RF CIRCUITS AND WIRELESS COMMUNICATION DEVICE UTILIZING THE SAME

(71) Applicant: AthenTek Incorporated, Taipei (TW)

(72) Inventor: Chun-Nan Chen, Taipei (TW)

(73) Assignee: AthenTek Incorporated, Taipei (TW)

( * ) Notice: Subject to any disclaimer, the term of this patent is extended or adjusted under 35 U.S.C. 154(b) by 78 days.

(21) Appl. No.: 14/589,747

(22) Filed: Jan. 5, 2015

(65) Prior Publication Data

US 2016/0037442 A1 Feb. 4, 2016

Related U.S. Application Data

(60) Provisional application No. 62/031,772, filed on Jul. 31, 2014.

(51) Int. Cl.
*H04W 48/16* (2009.01)
*H04W 52/02* (2009.01)

(52) U.S. Cl.
CPC ......... *H04W 48/16* (2013.01); *H04W 52/028* (2013.01); *H04W 52/0225* (2013.01); *H04W 52/0251* (2013.01); *Y02B 60/50* (2013.01)

(58) Field of Classification Search
None
See application file for complete search history.

(56) References Cited

U.S. PATENT DOCUMENTS

| | | | |
|---|---|---|---|
| 7,171,216 B1* | 1/2007 | Choksi | H04L 29/06 455/403 |
| 2003/0118015 A1* | 6/2003 | Gunnarsson | H04W 48/16 370/389 |
| 2006/0008256 A1* | 1/2006 | Khedouri | G06F 17/30038 386/234 |
| 2007/0026866 A1* | 2/2007 | Krishnamurthi | H04W 36/14 455/440 |
| 2014/0045481 A1* | 2/2014 | Fraley | H04W 52/0258 455/418 |
| 2014/0057629 A1* | 2/2014 | Liu | H04W 48/16 455/434 |
| 2014/0286190 A1* | 9/2014 | Vallabhu | H04W 52/0241 370/254 |

* cited by examiner

*Primary Examiner* — Kodzovi Acolatse (57) ABSTRACT

A method of locating a mobile device, and a mobile device utilizing the same are provided. The method, adopted by a wireless communication device, includes: searching for a plurality of signal-source types; in response to the searching, determining whether a first type of signal source is available; setting a search configuration based on availability of the first type of signal source; and searching again for the plurality of signal-source types according to the search configuration.

16 Claims, 4 Drawing Sheets

METHOD OF MANAGING POWER OF RF CIRCUITS AND WIRELESS COMMUNICATION DEVICE UTILIZING THE SAME

CROSS REFERENCE TO RELATED APPLICATIONS

This Application claims priority of U.S. Provisional Application No. 62/031,772, filed on Jul. 31, 2014, and the entirety of which is incorporated by reference herein.

BACKGROUND OF THE INVENTION

Field of the Invention

The present invention relates to power management, and in particular to a method of managing power in Radio Frequency (RF) circuits and a wireless communication device utilizing the same.

Description of the Related Art

Today, a wireless communication device such as a smartphone or tablet can support two or more RF technologies such as a global positioning system (GPS), Wireless Fidelity (WiFi), Bluetooth, and cellular communication including Global System for Mobile Communications (GSM), Universal Mobile Telecommunications System (UMTS), Long Term Evolution (LTE), and others. While providing convenience, running all RF capabilities on the wireless communication device causes an increase in the power consumption and a decrease in the battery life.

Therefore, a method and a wireless communication device are provided to manage the power for the RF circuits without degrading system performance.

BRIEF SUMMARY OF THE INVENTION

A detailed description is given in the following embodiments with reference to the accompanying drawings.

An embodiment of a method is described, adopted by a wireless communication device, comprising: searching for a plurality of signal-source types; in response to the searching, determining whether a first type of signal source is available; setting a search configuration based on availability of the first type of signal source; and searching again for the plurality of signal-source types according to the search configuration.

Another embodiment of a wireless communication device is disclosed, including a searching circuit, a signal type identification circuit and a search configuration circuit. The searching circuit is configured to search for a plurality of signal-source types. In response to the searching, the signal type identification circuit is configured to determine whether a first type of signal source is available. The search configuration circuit is configured to set a search configuration based on availability of the first type of signal source. The searching circuit is configured to search again for the plurality of signal-source types according to the search configuration.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Various aspects are described herein in connection with a wireless communication device, which can also be referred to as a mobile device, mobile station, system, device, wireless terminal, subscriber unit, subscriber station, mobile, remote station, remote terminal, access terminal, user terminal, terminal, communication device, wireless device, portable communication device, user agent, user device, or user equipment (UE). The mobile device may be a cellular telephone, a smartphone, a pager, a media player, a gaming console, a Session Initiation Protocol (SIP) phone, Personal Digital Assistant (PDA), a tablet computer, a laptop computer, a handheld device having wireless connection capability, a computing device, or any processing device connected to a wireless modem.

In the present application, embodiments of the invention are described primarily in the context of a smartphone. However, it should be appreciated that the invention is not intended to be limited to the context of a smartphone and may relate to any type of an appropriate wireless communication device.

A signal source described herein is a wireless transmitter, including but not limited to, a Bluetooth device, a Wireless Fidelity (WiFi) Access Point (AP), a cellular base station, or a navigation satellite.

Figure 1:
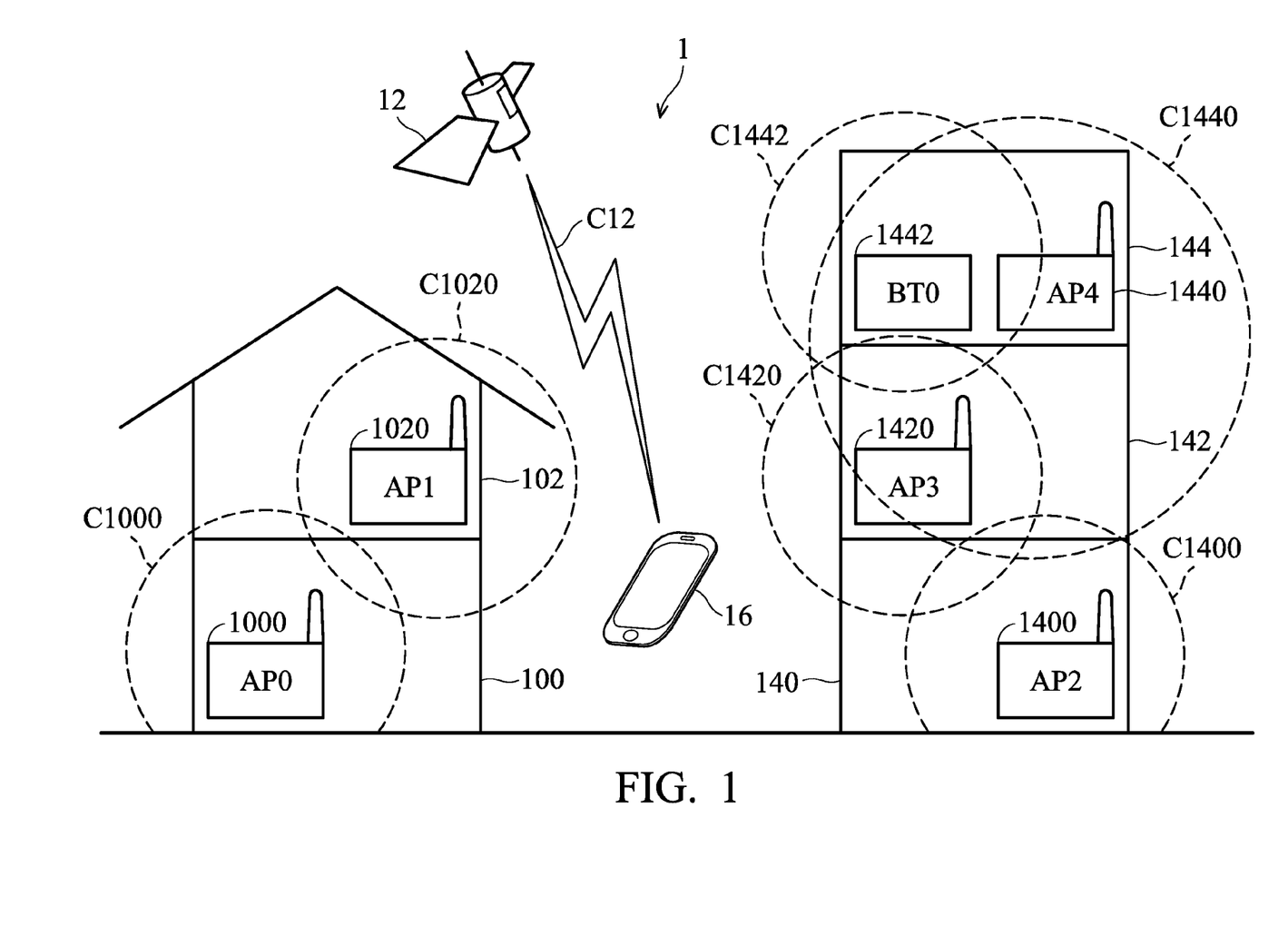
FIG. 1 is a schematic diagram illustrating power-control operations for RF circuits of a smartphone 18 according to an embodiment of the invention.

FIG. 1 is a schematic diagram illustrating an urban environment 1 according to an embodiment of the invention, including a residential house 10, an open street, and an office building 14. A smartphone 16 contains various Radio Frequency (RF) circuits to support various communication standards. Further, the smartphone 16 according to an embodiment of the invention may automatically assign high priorities to RF circuits which have detected signals, and low priorities to RF circuits which have failed to detect any signal from the surroundings. In some embodiments, the smartphone 16 may even automatically shut off the RF circuits that don't sense any signal from the location. By intelligently activating and deactivating the RF circuit based on the radio environment, the smartphone 16 provides increased data efficiency and power management without degrading the system performance. It is to be understood that embodiments of the power management to the RF circuits can be used in any environment, including but not limited to a street environment, home environment, office environment, retail environment, indoor environment, outdoor environment, urban environment and rural environment.

The smartphone 16 can only pick up specific types of RF signals of specific signal-source types from a location. For example, the smartphone 16 may only detect RF signals of WiFi APs 1000 and 1020 and cellular base stations (not shown) from the residential house 10, RF signals of the GPS satellite 12 and the cellular base stations from the street, and RF signals of WiFi APs 1400, 1420, 1440, Bluetooth device 1442, and the cellular base stations from the office building 14. The smartphone 16 may not detect certain types of signals, e.g., GPS signals from an indoor environment, e.g., the residential house 10 and office building 14. Likewise, the smartphone 16 may not detect certain types of signals, e.g., WiFi and Bluetooth signals from an outdoor environment, e.g., on the street. In another example, the smartphone 16 may only detect GPS signals but not WiFi, Bluetooth, and cellular signals from a rural environment.

In the present embodiment, when the radio environment changes, which is caused by the smartphone 16 moves to a new place or a new radio station is activated or deactivated, the smartphone 16 is configured to periodically scan or search for all types of RF signals in range, determine the availability of all signal-source types in range based on the search result, and then set a new search configuration (search strategy) based on the availability of the signal-source types, and subsequently scan or search for RF signals from the location according to the new search configuration. The types of RF signals may include, but are not limited to, WiFi, Bluetooth, cellular, and GPS signals. The signal-source types may include, but are not limited to, the WiFi and Bluetooth APs, cellular base stations, and navigation satellites. The search configuration may contain searching priorities of all signal-source types, or which signal-source types are searched and which are not to be searched in the next scan operation.

In the initial scan, the smartphone 16 may scan for all types of RF signals concurrently, or according to a default search order for all types of RF signals. As the smartphone 16 contains a plurality of RF circuits communicating with various signal-source types, it can activate and/or deactivate one or more RF circuits according to the search configuration. The smartphone 16 may run the power management for the RF circuits as a background application on Android, iOS, or another mobile platform.

In some embodiments, the smartphone 16 can set the search configuration when one or more signal-source types are unavailable for a predetermined period and/or a predetermined number of times, e.g., unavailable for a 60-second period twice.

In some embodiments, the smartphone 16 can determine that the radio environment has changed or a new place is visited based on the search information of available signal-source types. Specifically, when the search information of the detected signal-source types changes significantly from the previous search, the smartphone 16 may determine that the radio environment has changed or a new place is visited. When the detected signal source is a WiFi AP, the search information includes a WiFi identifier, a media access control (MAC) address, and a received signal strength indicator (RSSI) (signal strength) of the WiFi signals from the WiFi AP. When the detected signal source is a Bluetooth device, the search information includes a Bluetooth identifier, a Bluetooth address, and a Bluetooth RSSI (signal strength) of the Bluetooth signals from a Bluetooth device. When the detected signal source is a cellular base station such as a node B or evolved node B, the search information includes a cell identifier and an RSSI (signal strength) of the cellular signals from the cellular base station. When the detected signal source is a GPS satellite, the search information includes a satellite identifier and a Carrier to Noise Ratio (CNR) of the GPS signals from the GPS satellite.

In some embodiments, the smartphone 16 can determine that the radio environment has changed or a new place is visited based on a sensing signal of a motion sensor (not shown) installed on the smartphone 16. The motion sensor may be an accelerometer or a gyroscope sensor which measures proper acceleration of the smartphone 16 to indicate the motion status of the smartphone 16.

According to the embodiment in FIG. 1, in the residential house 10, the smartphone 16 may only detect RF signals of the WiFi APs 1000 and 1020 and cellular base stations but not the GPS signal from the GPS satellite 12, thus the RF circuit for the GPS signal is deactivated according to the search configuration. On the street, the smartphone 16 may detect RF signals of the GPS satellite 12, the cellular base stations and the WiFi APs, thus the RF circuit for the Bluetooth signals is deactivated according to the search configuration. In the office building 14, the smartphone 16 may only detect RF signals of the WiFi APs 1400, 1420, 1440, Bluetooth device 1442, and cellular base stations but not the GPS signal from the GPS satellite 12, thus the RF circuit for the GPS signal is deactivated according to the search configuration.

When visiting a new place or sensing that the radio environment changes, the smartphone 16 scans for a plurality of signal-source types, then subsequently searches signals only for the available signal-source types and stops sensing for the unavailable signal-source types, thereby providing increased data efficiency and power management without degrading system performance.

Figure 2:
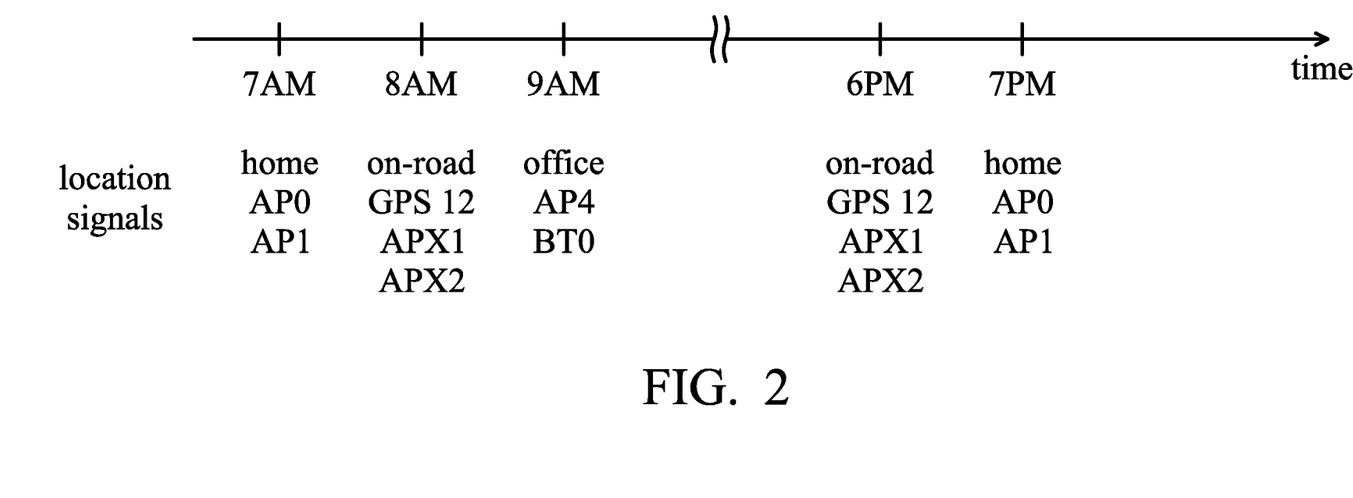
FIG. 2 is a timeline chart illustrating power-control operations for RF circuits of the smartphone 18 according to another embodiment of the invention.

FIG. 2 is a timeline chart illustrating power-control operations for RF circuits of the smartphone 18 according to another embodiment of the invention, incorporating with the urban environment 1 in FIG. 1. The timeline chart starts from 7 AM in the morning and ends at 7 PM in the evening.

Between 7 AM and 8 AM, the user of the smartphone 18 is at the house 10, the smartphone 18 can scan for all signal-source types in the vicinity, and detects WiFi signals from WiFi AP0 and AP1 but not any GPS signals from a GPS satellite or Bluetooth signals from a Bluetooth device. Therefore, the smartphone 18 automatically sets the search configuration by either moving the priorities of the GPS satellite and Bluetooth device to a decreased place or directly turning off the RF circuits for the GPS signals and Bluetooth signals. Afterwards, the smartphone 18 can regularly scan for the WiFi AP0 and AP1 in the house 10 according to the search configuration, until the motion of the smartphone 18 is sensed.

Between 7 AM and 8 AM, the user leaves the house 10 and is on the street on the way to work, the smartphone 18 can sense that it is in motion and the radio environment is changing, which triggers another scan for all signal-source types, and subsequently detects the GPS signal from GPS satellites and WiFi signals from WiFi APX1 and APX2 but no Bluetooth signal from a Bluetooth device. Therefore, the smartphone 18 automatically sets the search configuration by either moving the priority of the Bluetooth device to decreased places or directly turning off the RF circuits for the Bluetooth signals. Afterwards, the smartphone 18 can regularly scan for the GPS satellites on the street according to the search configuration, until a change in the radio environment of the smartphone 18 is sensed.

Between 9 AM and 6 PM, the user arrives the office at the top story 144 of the office building 14 and stays there for work, the smartphone 18 can sense that it is in motion and/or the radio environment has changed, which triggers a scan for all signal-source types, and subsequently detects only the WiFi signals from the WiFi AP4 and the Bluetooth signals from the Bluetooth device BT4 but not any GPS signals from a GPS satellite. Therefore, the smartphone 18 automatically sets the search configuration by either moving the priority of the GPS satellite to a decreased place or directly turning off the RF circuit for the GPS signals. Afterwards, the smartphone 18 can regularly scan for the WiFi AP4 and Bluetooth device BT0 in the office according to the search configuration, until the motion of the smartphone 18 is sensed.

Between 6 PM and 7 PM, the user leaves the office building 14 and is on the street on the way home, the smartphone 18 can sense that it is in motion and the radio environment is changing, again detecting the GPS signals and WIFI signals and consequently, sets the search configuration by either moving the priority of the Bluetooth device to decreased places or directly turning off the RF circuit for the Bluetooth signals. The smartphone 18 can then regularly scan for the GPS satellites on the street according to the search configuration After 7 PM, the user goes back the house 10, the smartphone 18 senses that the radio environment has changed and can scan for all signal-source types in the vicinity, and detects WiFi signals from WiFi AP0 and AP1 but not any GPS signals from a GPS satellite or Bluetooth signal from a Bluetooth device. Therefore, the smartphone 18 automatically sets the search configuration by either moving the priorities of the GPS satellite and Bluetooth device to decreased places or directly turning off the RF circuits for the GPS signals and Bluetooth signals. Later, the smartphone 18 can regularly scan for WiFi AP0 and AP1 in the house 10 according to the search configuration.

In the embodiment, when visiting a new place or sensing that the radio environment has changed, the smartphone 16 activates RF circuits for the available signal-source types and deactivates the RF circuits for the unavailable signal-source types, thereby providing increased data efficiency and power management without degrading system performance.

Figure 3:
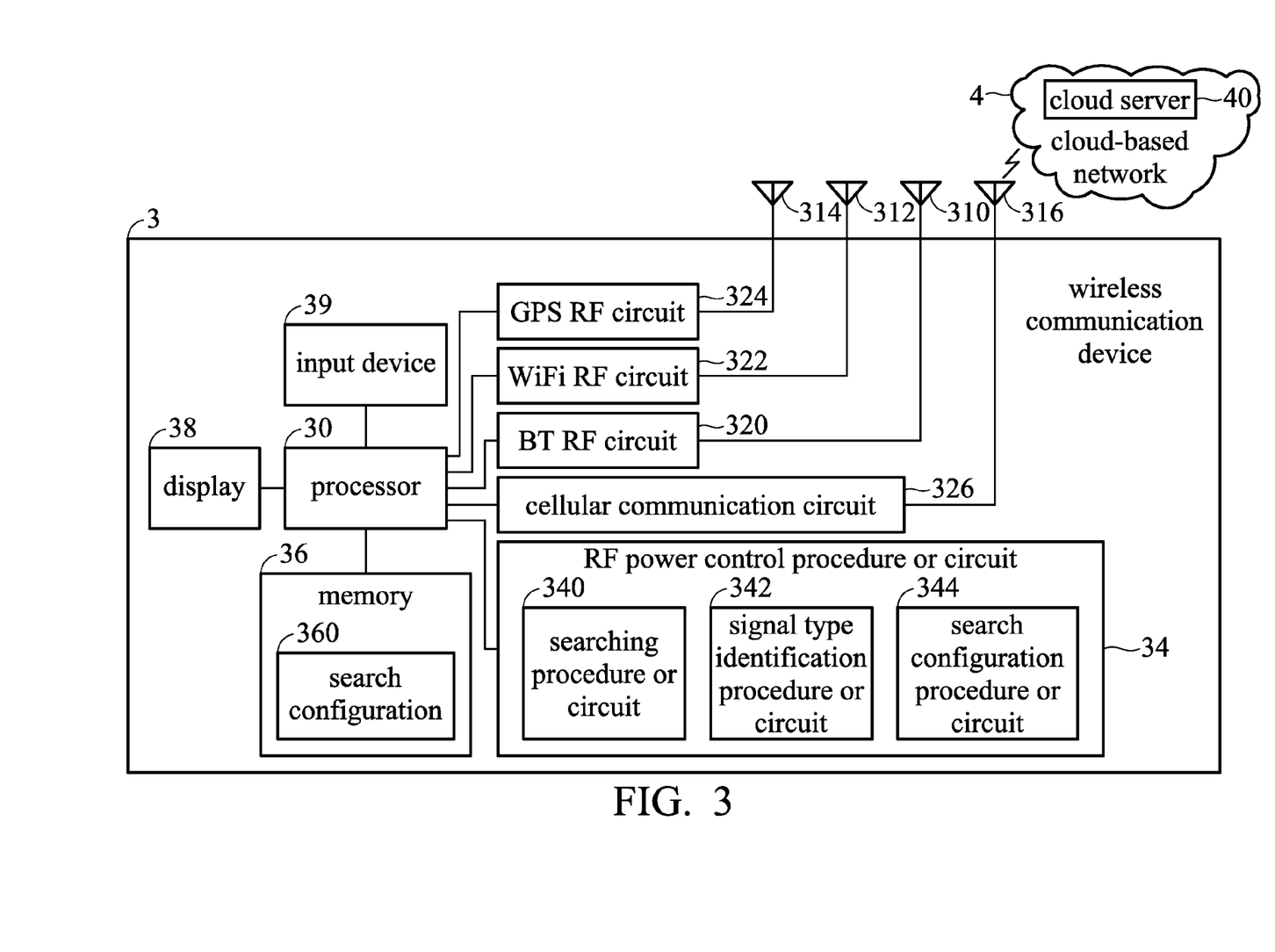
FIG. 3 is a block diagram of a wireless communication device 3 according to an embodiment of the invention.

FIG. 3 is a block diagram of a wireless communication device 3 according to an embodiment of the invention, containing a processor 30, Bluetooth RF circuit 320, WiFi RF circuit 322, GPS RF circuit 324, cellular communication circuit 326, Bluetooth antenna 310, WiFi antenna 312, GPS antenna 314, cellular communication antenna 316, power management procedure/circuit 34, memory device 36, display device 38 and input device 39. The wireless communication device 3 may be used as the smartphone 16 in FIG. 1.

Each of the Bluetooth RF circuit 320 and WiFi RF circuit 322 includes a transmitter circuit for transmitting and a receiver circuit for receiving the respective Bluetooth and WiFi signals via the respective Bluetooth antenna 310 and WiFi antenna 312. The GPS RF circuit 324 includes a receiver circuit for receiving the GPS signals via the GPS antenna 314. The Bluetooth RF circuit 320, WiFi RF circuit 322, GPS RF circuit 324 and the respective Bluetooth antenna 310, WiFi antenna 312, GPS antenna 314 may operate concurrently, sequentially, or independently. The signal strength such as RSSI may be measured and computed by computation circuits (not shown) in the Bluetooth RF circuit 320, WiFi RF circuit 322, and GPS RF circuit 324. In some embodiments, the wireless communication device 3 may utilize the cellular communication circuit 326 and the cellular communication antenna 316 for communicating with a cloud-based network 4, and/or a radio access network and/or local area network, and/or point-to-point connection, including Global System for Mobile Communications (GSM), General packet radio service (GPRS), Enhanced Data rates for GSM Evolution (EDGE), Universal Mobile Telecommunications System (UMTS), Code Division Multiple Access 2000 (CDMA2000), Enhanced Voice-Data Optimized (EVDO), High Speed Packet Access (HSPA), HSPA plus (GSPA+), Time Division-Synchronous Code Division Multiple Access (TD-SCDMA), Worldwide Interoperability for Microwave Access (WiMAX), Long Term Evolution (LTE), and LTE-Advanced (LTE-A) systems. The cellular communication circuit 326 includes a transmitter circuit for transmitting and a receiver circuit for receiving cellular communication data.

The power management procedure or circuit 34 is configured to automatically manage the power of the RF circuits 310 through 314 in the wireless communication device 3 by the power management operation described in the preceding sections. The power management procedure or circuit 34 may be embodied as executable codes that are resident in the memory device 36 and executed by the processor 30, or a hardware circuit which performs the operation. When implemented as executable codes, the power management procedure or circuit 34 may be a power management application operating on the smartphone 18. The power management procedure or circuit 34 includes a searching procedure or circuit 340, a signal type identification procedure or circuit 342 and a search configuration procedure or circuit 344.

When visiting a new place or sensing that the radio environment has changed, the searching procedure or circuit 340 is configured to search at the new location for all of signal-source types including the WiFi AP, Bluetooth device, GPS satellite, and cellular base stations. When the wireless communication device 3 is substantially stationary and remains at substantially the same place, the searching procedure or circuit 340 is configured to search for the plurality of signal-source types according to a search configuration 360 stored in the memory 36. The power management procedure or circuit 34 may process, decode, and analyze a detected RF signal to determine the search information of a detected signal source, and then store the search information in a search configuration 360 in the memory 36. The search information may include the device ID, device address, and received signal strength of the detected signal source. The cellular communication circuit 326 and the cellular communication antenna 316 may upload the detected signal sources along with their search information to a cloud server 40 in the cloud-based network 4. The cloud server 40 may configure setting and/or control operations of the wireless communication device 3 based on the uploaded information, e.g., the cloud server 40 may configure the search configuration 360 for the wireless communication device 3 based on the uploaded information.

The search configuration 360 stored in the memory device 36 may be embodied as indicated in the following table, Table 1:

TABLE 1

| Search number | WiFi information | Bluetooth information | GPS information |
|---|---|---|---|
| S1 | WiFi_AP_0; mac=aa:bb:cc:dd:ee:f0; RSSI = −70 WiFi_AP_1; | BT_device_0; BT_addr = xxxxxx:yy:zzz0; RSSI = −70 | N/A |

TABLE 1-continued

| Search number | WiFi information | Bluetooth information | GPS information |
|---|---|---|---|
| | mac=aa:bb:cc:dd:ee:f1; RSSI = −80 WiFi_AP_2; mac=aa:bb:cc:dd:ee:f2; RSSI = −90 WiFi_AP_3; mac=aa:bb:cc:dd:ee:f3; RSSI = −80 | | |

The search configuration 360 includes a search information entry, i.e., search information S1. The search information S1 includes 4 WiFi signal sources and 1 Bluetooth signal source; and the search information S2 also includes 4 WiFi signal sources and 1 Bluetooth signal source. The search information contain information such as device ID, the device address, and the received signal strength. For example, WiFi information "WiFi_AP_0; mac=aa:bb:cc:dd:ee:f0; RSSI=−70" indicates that a WiFi AP has a device ID of WiFi_AP_0, a MAC address of aa:bb:cc:dd:ee:f0, and a received signal strength indicator of −70 dB.

The power management procedure or circuit 34 may determine that the wireless communication device 3 is in motion or the radio environment has changed based on the search information. In one implementation, the power management procedure or circuit 34 may determine its motion status by a motion sensor (not shown) on the wireless communication device 3. In another implementation, the power management procedure or circuit 34 may compare current search information, e.g., search information S2 in Table 2 or search information S3 in Table 3, with the previous search information, e.g., the search information S1 in Table 1 in terms of the number of detected signal sources, device ID, device address, or received signal strength.

TABLE 2

| Search number | WiFi information | Bluetooth information | GPS information |
|---|---|---|---|
| S2 | WiFi_AP_0; mac=aa:bb:cc:dd:ee:f0; RSSI = −70 WiFi_AP_1; mac=aa:bb:cc:dd:ee:f1; RSSI = −70 WiFi_AP_2; mac=aa:bb:cc:dd:ee:f2; RSSI = −90 WiFi_AP_3; mac=aa:bb:cc:dd:ee:f3; RSSI = −80 | BT_device_0; BT_addr = xxxxxx:yy:zzz0; RSSI = −70 | N/A |

TABLE 3

| Search number | WiFi information | Bluetooth information | GPS information |
|---|---|---|---|
| S3 | WiFi_AP_0; mac=aa:bb:cc:dd:ee:f0; RSSI = −90 WiFi_AP_4; mac=aa:bb:cc:dd:ee:f4; RSSI = −70 | N/A | GPS_0; CNR = 40 38, 34, 36 |

The current search information S2 or S3 may be buffered in the power management procedure or circuit 34 or stored in the memory device 36. When the current search information is substantially the same as the previous search information, e.g., the current search information S2 and the previous search information S1, the power management procedure or circuit 34 may determine that the wireless communication device 3 is substantially stationary. Whereas when the current search information is different from the previous search information, e.g., the current search information S3 and the previous search information S1, the power management procedure or circuit 34 may determine that the wireless communication device 3 is in motion or the radio environment has changed.

In response to the initial search while visiting a new place or sensing that the radio environment has changed, the signal type identification procedure or circuit 342 is configured to determine which type of signal source is available and which type of signal source is unavailable in the new location. The search configuration procedure or circuit 344 is configured to set the search configuration 360 based on the availability of the type of signal source and store the search configuration 360 into the memory 36. Specifically, the search configuration procedure or circuit 344 may turn off the RF circuit when the corresponding type of signal source is unavailable from the current location for a predetermined period of time, e.g., 1 min, and/or a predetermined number of times, e.g., twice.

The display device 38 is optional, and may be an LCD panel, a touch panel, or a projection device. The input device 39 is optional, and may be a keyboard, a mouse, or a touch panel. In some embodiments, a touch panel may be used to implement the display device 38 and input device 39.

Figure 4:
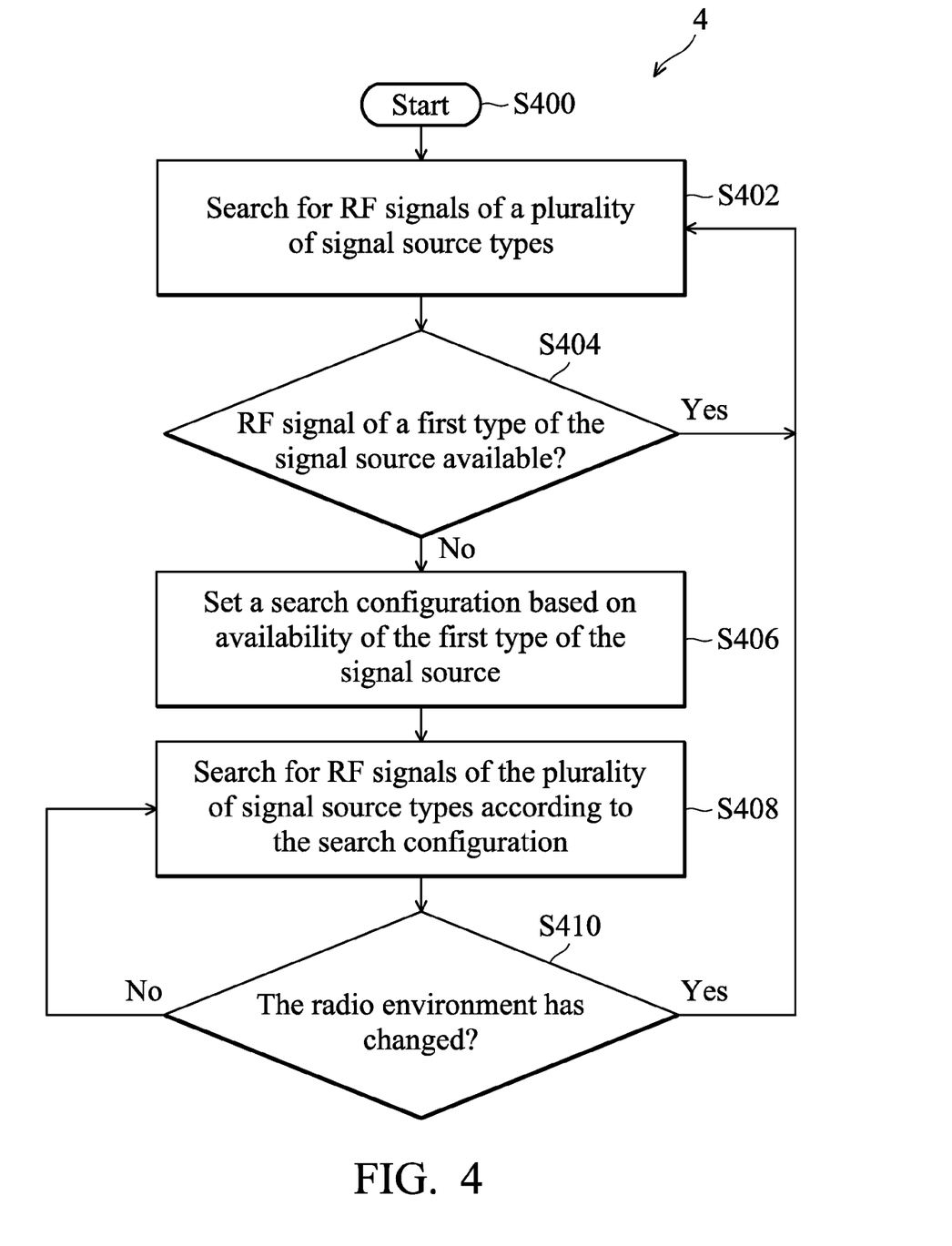
FIG. 4 is a flowchart of a power-control method 4 according to an embodiment of the invention.

FIG. 4 is a flowchart of a power-control method 4 according to an embodiment of the invention, incorporating the wireless communication device 3 in FIG. 3. The power-control method 4, which constructs and manages a location log in the wireless communication device 3, may be implemented by executable codes that are executable by the processor 300 or hardware circuits performing the following steps.

The power-control method 4 may be initiated upon system startup or launched by a user on the mobile platform of the wireless communication device 3 (S400). Upon startup, the wireless communication device 3 searches for RF signals of a plurality of signal-source types broadcast in the range (S402). Then, the wireless communication device 3 determines whether the RF signal of a first type of signal source is available (S404). The first type of signal source may be of any type of wireless communication, including Bluetooth, WiFi, cellular, and GPS. When the first type of signal source is available, the wireless communication device 3 returns to Step S402 to continue checking for the availability of the first type of signal source.

When the first type of signal source is unavailable, the wireless communication device 3 sets a search configuration based on the availability of the first type of signal source (S406). In one embodiment, the wireless communication device 3 may decrease a first priority of the first type of signal source in a search configuration. In another embodiment, the wireless communication device 3 may change the search configuration by deactivating the RF circuit for communicating with the first type of the signal source. In still another embodiment, the wireless communication device 3 only adapts the search configuration when the first type of signal source is unavailable a predetermined number of times in a predetermined period of time, for example, 3 times in 3 minutes.

Subsequently, the wireless communication device 3 then searches for the RF signals of the plurality of signal-source types according to the search configuration (S408). For example, the GPS type of signal source may be set as the last priority in the search configuration, and the wireless communication device 3 may search WiFi, Bluetooth, and cellular stations before the GPS satellite according to the search configuration.

Next, the wireless communication device 3 determines whether the radio environment has been changed (S410). The changed radio environment may be caused by the motion of the wireless communication device 3 from one place to another place or a new radio station in the coverage is activated or deactivated. When the radio environment remains substantially unchanged, the wireless communication device 3 can continue to monitor for the RF signals of the plurality of signal-source types according to the search configuration (S408). When the radio environment has changed, the wireless communication device 3 can search for the availability of all signal-source types without the search configuration (S402). The wireless communication device 3 may determine its status of the radio environment by comparing the current with previous search information, or by the motion sensor embedded in the wireless communication device 3.

In the embodiments in FIGS. 3 and 4, when visiting a new place or sensing that the radio environment has changed, the wireless communication device 3 activates RF circuits for the available signal-source types and deactivates the RF circuits for the unavailable signal-source types, thereby providing increased data efficiency and power management without degrading system performance.

As used herein, the term "determining" encompasses calculating, computing, processing, deriving, investigating, looking up (e.g., looking up in a table, a database or another data structure), ascertaining and the like. Also, "determining" may include resolving, selecting, choosing, establishing and the like.

The various illustrative logical blocks, modules and circuits described in connection with the present disclosure may be implemented or performed with a general purpose processor, a digital signal processor (DSP), an application-specific integrated circuit (ASIC), a field programmable gate array signal (FPGA) or another programmable logic device, discrete gate or transistor logic, discrete hardware components or any combination thereof designed to perform the functions described herein. A general-purpose processor may be a microprocessor, but in the alternative, the processor may be any commercially available processor, controller, microcontroller or state machine.

The operations and functions of the various logical blocks, modules, and circuits described herein may be implemented in circuit hardware or embedded software codes that can be accessed and executed by a processor.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method, adopted by a wireless communication device, comprising:
   receiving and transmitting signals of a plurality of signal-source types, wherein signals of each of the signal-source types are received and transmitted respectively by one of a plurality of radio frequency circuits;
   searching for the plurality of signal-source types;
   in response to the searching, determining whether a first type of signal source of the plurality of signal-source types is available;
   setting a search configuration based on availability of the first type of signal source; and
   searching again for the plurality of signal-source types according to the search configuration;
   wherein the step of searching for the plurality of signal-source types comprises: when second information of a second type of signal source has been changed from a previous search, searching for the plurality of signal-source types without the search configuration;
   wherein the second information comprises a device identifier and a signal strength of the second type of signal source.

2. The method of claim 1, wherein the search configuration contains a first priority for searching for the first type of signal source; and
   the step of setting the search configuration comprises: decreasing the first priority of searching for the first type of signal source when the first type of signal source is unavailable.

3. The method of claim 1, wherein the search configuration contains a first search status for searching for the first type of signal source; and
   the step of setting the search configuration comprises: when the first type of signal source is unavailable, setting the first search status to off to stop searching for the first type of signal source.

4. The method of claim 3, further comprising the step of deactivating the radio frequency circuit receiving and transmitting the first type of signal source when it is determined that the first type of signal source is unavailable.

5. The method of claim 1, wherein the step of setting the search configuration comprises:
   setting the search configuration when first type of signal source is unavailable a predetermined number of times.

6. The method of claim 1, wherein the step of searching for the plurality of signal-source types comprises:
   when the wireless communication device is in motion, searching for the plurality of signal-source types without the search configuration.

7. The method of claim 1, wherein the first signal is a GPS signal, the first type of signal source is a GPS satellite, and signals of the first type of signal source are received and transmitted by a GPS radio frequency circuit of the radio frequency circuits.

8. The method of claim 1, wherein the first signal is a WiFi or Bluetooth signal, the first type of signal source is a WiFi or Bluetooth Access Point (AP), and the first type of signal source is received and transmitted by a WiFi or Bluetooth radio frequency circuit of the radio frequency circuits.

9. A wireless communication device, comprising:
   a plurality of radio frequency circuits, wherein each of the radio frequency circuits is respectively configured to receive and transmit signals one of a plurality of signal-source types;
   a searching circuit, configured to search for the plurality of signal-source types;
   a signal type identification circuit, in response to the searching, configured to determine whether a first type of signal source of the plurality of signal-source types is available; and
   a search configuration circuit, configured to set a search configuration based on availability of the first type of signal source; wherein the searching circuit is configured to search again for the plurality of signal-source types according to the search configuration;

wherein: when second information of a second type of signal source has been changed from a previous search, the searching circuit is configured to search for the plurality of signal-source types without the search configuration, wherein the second information comprises a device identifier and a signal strength of the second type of signal source.

10. The wireless communication device of claim 9, further comprising:

a memory, configured to store the search configuration which contains a first priority for searching for the first type of signal source;

wherein the search configuration circuit is configured to decrease the first priority of searching for the first type of signal source when the first type of signal source is unavailable.

11. The wireless communication device of claim 9, wherein the search configuration contains a first search status for searching for the first type of signal source; and when the first type of signal source is unavailable, the search configuration circuit is configured to set the first search status to off to stop searching for the first type of signal source.

12. The wireless communication device of claim 9, wherein when the first type of signal source is unavailable a predetermined number of times, the search configuration circuit is configured to set the search configuration.

13. The wireless communication device of claim 9, wherein when the wireless communication device is in motion, the searching circuit is configured to search for the plurality of signal-source types without the search configuration.

14. The wireless communication device of claim 9, wherein the first signal is a GPS signal, the first type of signal source is a GPS satellite, and the first type of signal source is received and transmitted by a GPS radio frequency circuit of the radio frequency circuits.

15. The wireless communication device of claim 9, wherein the first signal is a WiFi or Bluetooth signal, and the first type of signal source is a WiFi or Bluetooth Access Point (AP), and signals of the first type of signal source are received and transmitted by a WiFi or Bluetooth radio frequency circuit of the radio frequency circuits.

16. The wireless communication device of claim 9, wherein the radio frequency circuit receiving and transmitting the first type of signal source is deactivated when the signal type identification circuit determines that the first type of signal source is unavailable.

* * * * *